(12) United States Patent
Zhu (10) Patent No.: US 11,008,090 B2
(45) Date of Patent: May 18, 2021

(54) AIRCRAFT GENERATING LARGER LIFT BY REDUCTION OF FLUID RESISTANCE

(71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 0 days.

(21) Appl. No.: 16/564,844

(22) Filed: Sep. 9, 2019

(65) Prior Publication Data

US 2020/0017198 A1 Jan. 16, 2020

Related U.S. Application Data

(63) Continuation of application No. PCT/CN2018/091827, filed on Jun. 19, 2018.

(30) Foreign Application Priority Data

Apr. 26, 2017 (CN) .......................... 201710282079.5

(51) Int. Cl.
*B64C 21/02* (2006.01)
*B64C 1/00* (2006.01)
(Continued)

(52) U.S. Cl.
CPC ............ *B64C 21/02* (2013.01); *B64C 1/0009* (2013.01); *B64C 1/26* (2013.01); *B64C 3/14* (2013.01);
(Continued)

(58) Field of Classification Search
CPC ... B64C 1/0009; B64C 1/26; B64C 2003/143; B64C 2003/148; B64C 21/02;
(Continued)

(56) References Cited

U.S. PATENT DOCUMENTS

| 1,868,832 A | * | 7/1932 | Henter | ................. B64C 23/005 244/209 |
| 2,404,954 A | * | 7/1946 | Godsey, Jr. | ............... F02K 3/06 60/262 |

(Continued)

FOREIGN PATENT DOCUMENTS

| CA | 2 597 642 C | 12/2012 |
| CN | 101224790 A | 7/2008 |

(Continued)

OTHER PUBLICATIONS

International Search Report dated Sep. 26, 2018, issued to International Application No. PCT/CN 2018/091827.

(Continued)

*Primary Examiner* — Medhat Badawi
(74) *Attorney, Agent, or Firm* — Stein IP, LLC (57) ABSTRACT

The invention discloses a lift source for an aircraft comprising a fuselage and wings, wherein first channels are formed in the wings, a plurality of first inlets are formed in upper surfaces of the wings, a plurality of first pressure ports are formed in lower surfaces of the wings and are communicated with the first inlets via the first channels; and spoiler devices are arranged in the first channels and under the effect of the spoiler devices, form high-speed fluid layers on the upper surfaces of the wings, thereby generating a pressure difference from the lower surfaces of the wings which counteracts an external fluid pressure on the upper surfaces of the wings in the opposite direction, so a lift is generated by reduction of fluid resistance when fluid flows through the upper and lower surfaces of the wings, thereby developing a high-speed aircraft with a larger lift and thrust.

8 Claims, 2 Drawing Sheets

(51) Int. Cl.
  *B64C 1/26* (2006.01)
  *B64C 3/14* (2006.01)
  *B64C 3/58* (2006.01)
  *B64C 27/06* (2006.01)
  *B64C 27/467* (2006.01)
  *B64D 27/02* (2006.01)

(52) U.S. Cl.
  CPC ............... *B64C 3/58* (2013.01); *B64C 27/06* (2013.01); *B64C 27/467* (2013.01); *B64D 27/02* (2013.01); *B64C 2003/148* (2013.01); *B64C 2230/08* (2013.01); *B64C 2230/28* (2013.01)

(58) Field of Classification Search
  CPC . B64C 21/06; B64C 2230/04; B64C 2230/08; B64C 2230/20; B64C 2230/28; B64C 27/06; B64C 27/467; B64C 3/14; B64C 3/58; B64C 21/10; B64C 2230/26; B64C 39/026; B64C 3/141; B64C 39/00; B64C 39/06; B64C 27/04; B64C 39/001; B64C 15/00; B64C 23/005; B64C 2700/6271; B64C 2700/6274; B64C 29/0025; B64D 27/02; B60V 1/22; Y02T 50/10; Y02T 50/60
  See application file for complete search history.

(56) References Cited

U.S. PATENT DOCUMENTS

| | | | | |
|---|---|---|---|---|
| 2,465,457 A * | 3/1949 | Johnston | B64B 1/40 | 244/52 |
| RE23,105 E * | 4/1949 | Stalker | F02K 3/12 | 244/15 |
| 2,659,552 A * | 11/1953 | Stalker | B64C 21/06 | 244/209 |
| 2,670,597 A * | 3/1954 | Villemejane | F02K 7/005 | 60/791 |
| 2,684,817 A * | 7/1954 | Roy | B64C 21/06 | 244/15 |
| 2,751,168 A * | 6/1956 | Stalker | B64C 21/06 | 244/15 |
| 2,772,058 A * | 11/1956 | Grant | B64C 21/02 | 244/216 |
| 2,821,351 A * | 1/1958 | Utgoff | B64D 27/18 | 244/15 |
| 2,885,162 A * | 5/1959 | Griswold, II | B64C 23/005 | 244/207 |
| 2,918,230 A * | 12/1959 | Lippisch | B64C 39/062 | 244/23 R |
| 2,918,232 A * | 12/1959 | Lippisch | B64C 29/0025 | 244/23 R |
| 2,925,231 A * | 2/1960 | Pfaff | B64C 21/06 | 244/209 |
| 2,969,759 A * | 1/1961 | Giles | B63B 1/34 | 114/20.1 |
| 2,988,302 A * | 6/1961 | Smith | B64C 21/025 | 244/15 |
| 3,017,139 A * | 1/1962 | Binder | B64C 39/062 | 244/12.6 |
| 3,055,614 A * | 9/1962 | Thompson | B64C 23/005 | 244/15 |
| 3,097,817 A * | 7/1963 | Towzey, Jr. | B64C 29/005 | 244/15 |
| 3,126,171 A * | 3/1964 | Stepniewski et al. | B60V 1/08 | 244/12.5 |
| 3,161,018 A * | 12/1964 | Sandre | F02K 7/16 | 60/262 |
| 3,161,377 A * | 12/1964 | Balluff | B64C 21/025 | 244/52 |
| 3,172,253 A * | 3/1965 | Hughes | F02K 1/165 | 60/263 |
| 3,231,038 A * | 1/1966 | Weiland | B60V 1/22 | 180/120 |
| 3,317,162 A * | 5/1967 | Grant | B64C 23/005 | 244/209 |
| 3,424,404 A * | 1/1969 | Rea | B64C 29/0025 | 244/12.1 |
| 3,465,988 A * | 9/1969 | Orr | B64C 29/0025 | 244/12.1 |
| 3,829,043 A * | 8/1974 | Benson | B60V 1/02 | 244/12.1 |
| 3,854,286 A * | 12/1974 | Klees | F02K 3/077 | 60/204 |
| 4,384,630 A * | 5/1983 | Steiner | B62D 35/00 | 180/7.1 |
| 4,494,713 A * | 1/1985 | Kim | B64C 39/10 | 244/15 |
| 4,500,052 A * | 2/1985 | Kim | F02K 3/08 | 244/12.1 |
| 4,568,042 A * | 2/1986 | Carr | B64C 39/00 | 244/12.1 |
| 4,579,300 A * | 4/1986 | Carr | B64C 39/062 | 244/12.1 |
| 4,651,953 A * | 3/1987 | Kim | F02K 3/08 | 244/12.1 |
| 4,666,104 A * | 5/1987 | Keiber | B64C 21/06 | 244/12.1 |
| 4,667,900 A * | 5/1987 | Kim | B64D 27/20 | 137/15.1 |
| 4,824,048 A * | 4/1989 | Kim | B64D 27/20 | 244/12.2 |
| 4,848,701 A * | 7/1989 | Belloso | B64C 21/04 | 244/12.5 |
| 4,993,663 A * | 2/1991 | Lahti | B64D 29/00 | 244/53 B |
| 5,167,387 A * | 12/1992 | Hartwich | B64C 21/025 | 244/200 |
| 5,263,667 A * | 11/1993 | Horstman | B64C 21/06 | 244/209 |
| 5,280,827 A * | 1/1994 | Taylor | F03D 3/0454 | 180/165 |
| 5,307,624 A * | 5/1994 | Even-Nur | F02K 3/075 | 60/226.3 |
| 5,366,177 A * | 11/1994 | DeCoux | B64C 21/06 | 244/201 |
| 5,531,406 A * | 7/1996 | Redekopp | B64C 21/06 | 244/208 |
| 5,538,201 A * | 7/1996 | Gerhardt | B64C 3/10 | 244/204 |
| 5,590,854 A * | 1/1997 | Shatz | B64C 3/141 | 244/206 |
| 5,836,542 A * | 11/1998 | Burns | F02K 9/42 | 244/12.2 |
| 5,848,768 A * | 12/1998 | Seyfang | B64C 23/00 | 244/198 |
| 6,068,219 A * | 5/2000 | Arata | B64C 3/50 | 244/219 |
| 6,216,982 B1 * | 4/2001 | Pfennig | B64C 21/06 | 244/130 |
| 6,450,111 B1 * | 9/2002 | Cocksedge | B60V 1/14 | 114/67 A |
| 6,607,162 B2 * | 8/2003 | Warsop | B64C 39/062 | 244/12.6 |
| 7,150,432 B2 * | 12/2006 | Ouellette | B64D 27/18 | 244/53 B |
| 7,152,829 B2 * | 12/2006 | Bertolotti | B64C 21/06 | 244/209 |
| 8,500,061 B2 * | 8/2013 | Chen | B64C 29/005 | 244/12.5 |
| 8,545,279 B2 * | 10/2013 | Cantemir | B63H 11/14 | 440/38 |
| 8,690,106 B1 * | 4/2014 | Reissig | B64C 21/025 | 244/208 |
| 8,702,042 B2 * | 4/2014 | Gerber | B64C 21/06 | 244/209 |
| 8,910,903 B2 | 12/2014 | Zhu | | 244/12.1 |
| 9,272,772 B2 * | 3/2016 | Reckzeh | B64C 21/02 | |

(56) References Cited

U.S. PATENT DOCUMENTS

| | | | | |
|---|---|---|---|---|
| 9,278,753 B2* | 3/2016 | Reckzeh | | B64C 21/02 |
| 9,487,287 B2* | 11/2016 | Wood | | B64C 21/06 |
| 9,745,047 B2 | 8/2017 | Zhu | | 3/141 |
| 2003/0192987 A1* | 10/2003 | Ahrendt | | B64D 29/08 |
| | | | | 244/54 |
| 2009/0065631 A1* | 3/2009 | Zha | | B64C 21/025 |
| | | | | 244/12.1 |
| 2009/0108125 A1* | 4/2009 | Shmilovich | | B64C 21/04 |
| | | | | 244/15 |
| 2009/0212165 A1* | 8/2009 | Parikh | | B64C 21/06 |
| | | | | 244/209 |
| 2010/0007172 A1* | 1/2010 | Zhu | | B62D 35/02 |
| | | | | 296/181.5 |
| 2010/0116943 A1* | 5/2010 | Meister | | B64C 21/08 |
| | | | | 244/208 |
| 2010/0294893 A1* | 11/2010 | Heintze | | B64C 3/48 |
| | | | | 244/219 |
| 2011/0001000 A1* | 1/2011 | Zhu | | B64C 39/001 |
| | | | | 244/12.1 |
| 2011/0006165 A1* | 1/2011 | Ireland | | B64C 23/06 |
| | | | | 244/200.1 |
| 2011/0168843 A1* | 7/2011 | Calder | | F02C 7/047 |
| | | | | 244/134 B |
| 2011/0198444 A1* | 8/2011 | Dong | | B64D 41/00 |
| | | | | 244/130 |
| 2011/0293421 A1* | 12/2011 | Denner | | F03D 1/0641 |
| | | | | 416/92 |
| 2012/0043428 A1* | 2/2012 | Goelling | | B64C 21/08 |
| | | | | 244/208 |
| 2012/0085867 A1* | 4/2012 | Bardwell | | B64D 15/06 |
| | | | | 244/134 B |
| 2013/0181095 A1* | 7/2013 | Akhmejanov | | B64C 39/062 |
| | | | | 244/23 C |
| 2013/0306803 A1 | 11/2013 | Zhu | | 244/23 C |
| 2014/0312166 A1* | 10/2014 | Zhu | | B64C 11/18 |
| | | | | 244/17.11 |
| 2016/0229517 A1* | 8/2016 | Zhu | | B64C 3/141 |
| 2016/0368566 A1* | 12/2016 | Zhu | | B63G 8/04 |
| 2017/0197697 A1* | 7/2017 | Zhu | | B64C 27/06 |
| 2020/0001980 A1* | 1/2020 | Zhu | | B64C 3/14 |
| 2020/0017198 A1* | 1/2020 | Zhu | | B64C 3/14 |

FOREIGN PATENT DOCUMENTS

| | | |
|---|---|---|
| CN | 101602404 A | 12/2009 |
| CN | 102556345 A | 7/2012 |
| CN | 107150788 A | 9/2017 |

OTHER PUBLICATIONS

First Office Action dated Dec. 25, 2018, issued to Chinese Application No. 201710282079.5.

Second Office Action dated Jul. 31, 2019, issued to Chinese Application No. 201710282079.5.

* cited by examiner

AIRCRAFT GENERATING LARGER LIFT BY REDUCTION OF FLUID RESISTANCE

CROSS-REFERENCE TO RELATED APPLICATIONS

This application is a continuation of International Application No. PCT/CN2018/091827, filed Jun. 19, 2018, which claims the benefit of Chinese Application No. 201710282079.5, filed Apr. 26, 2017, in the China National Intellectual Property Administration. All disclosures of the documents named above are incorporated herein by reference.

TECHNICAL FIELD

The invention relates to the technical field of aircrafts, in particular to an aircraft generating a larger lift by reduction of fluid resistance.

DESCRIPTION OF RELATED ART

Due to the small difference between upper arc surfaces and lower planar surfaces of the wings of fixed-wing aircrafts, the lift generated by the fixed-wing aircrafts is small. The lift and thrust generated by rotary-wing aircrafts driven by propellers are also small. Meanwhile, all aircrafts will inevitably generate great fluid resistance in the course of generating a lift, and most energy of the aircrafts is consumed for overcoming the fluid resistance. For this reason, the actual energy utilization rate of existing aircrafts is very low.

In U.S. Invention patent Ser. No. 13/864,370 granted rights and titled "Flying Saucer Generating Larger Lift from Interior Thereof" and U.S. Pat. No. 9,745,047B2 granted rights and titled "Airplane Generating Larger Lift from Interior Thereof", the inventor has disclosed a winged or wingless aircraft generating a larger lift from the interior thereof.

BRIEF SUMMARY OF THE INVENTION

The technical issue to be settled by the invention is to obtain a larger lift by reduction of fluid resistance.

In the invention, the flow speed on upper surfaces of wings is increased to generate a larger pressure difference between the upper surfaces and lower surfaces of the wings, and the upper surfaces and the lower surfaces of the wings are communicated via a plurality of air vents to directly transfer a high pressure generated on the lower surfaces of the wings towards a low pressure generated on the upper surfaces of the wings in a direction opposite to an external fluid pressure on the upper surfaces of the wings so as to counteract the external fluid pressure. With the increase of the flow speed difference between the upper surfaces and lower surfaces of the wings, more fluid resistance will be reduced, and a larger lift will be generated.

As is known to all, moving devices consume about 90% of power to overcome the fluid resistance, which means that the energy utilization rate of the moving devices is only about 10%. If 10% of the fluid pressure is transferred out by means of the pressure difference generated due to different flow speeds of the upper surfaces and lower surfaces of the wings, the thrust will be increased by 100% theoretically. If 20%, 40%, 50%, or even more fluid pressure is transferred out, the thrust will be increased by more times. In the invention, a larger lift is obtained by reduction of the fluid resistance in the absence of fluid continuity.

The key concept of the invention lies in that: the upper surfaces and lower surfaces of the wings are communicated with first channels in the wings via a plurality of first inlets and a plurality of first pressure ports respectively; and when fluid gradually flows through the upper and lower surfaces of the wings, a high pressure is gradually and uniformly transferred to a low pressure generated by high-speed fluid layers formed by the upper surfaces and the first channels via the small first pressure ports in a direction opposite to an external pressure on the upper surfaces of the wings so as to counteract the external pressure, and thus, a lift is generated.

Therefore, a primary lift of the invention is generated by reduction of the fluid resistance instead of by fluid continuity.

Moreover, the fluid flows through the upper surfaces and lower surfaces of the wings along different paths to reach rear parts at the same time to generate a secondary lift of the invention.

The invention has the following beneficial effects: according to common knowledge, a lift is indirectly generated after fluid flows through the upper surfaces and the lower surfaces of the wings along different paths to reach the rear parts at the same time to be converged, and fluid resistance is generated at the same time.

On the contrary, in the invention, a primary lift is directly generated by gradual reduction of the fluid resistance when fluid gradually flows through the upper surfaces and lower surfaces of the wings along different paths and before the fluid reaches the back to realize fluid continuity.

It is first discovered in the invention that the primary lift is directly generated by reduction of fluid resistance in the absence of fluid continuity. The primary lift is much larger than a lift indirectly generated by traditional wings through fluid continuity.

Furthermore, the fluid flows through the upper surfaces and lower surfaces of the wings along different paths to reach the rear parts at the same time to generate the secondary lift of the invention according to the fluid continuity, and the primary lift and the secondary lift are superposed to form a larger lift of an aircraft.

REFERENCE SIGNS 1, fuselage; 101, upper surface of wing; 102, lower surface of wing; 103; upper half; 104, lower half; 105, second channel; 106, second inlet; 107, second pressure port; 108, third channel; 109, front part; 110, middle part; 111, rear part; 112, control device; 2, wing; 201, first channel; 202, first inlet; 203, first pressure port; 204, concave channel; 205, convex channel; 206, spoiler; 207, spiral spoiler bar; 208, first outlet; 209, pressure pipe; 210, spiral spoiler surface; 211, root of wing; 212, tail of wing; 3, engine; 301, suction port; 302, jet port; 4, propeller; 401, blade; 402, windward side; 403, leeward side; 404, second outlet; 5, high-speed fluid layer.

DETAILED DESCRIPTION OF THE INVENTION

The technical contents, objectives, and effects of the invention are expounded below with reference to the implementations and accompanying drawings.

Figure 1:
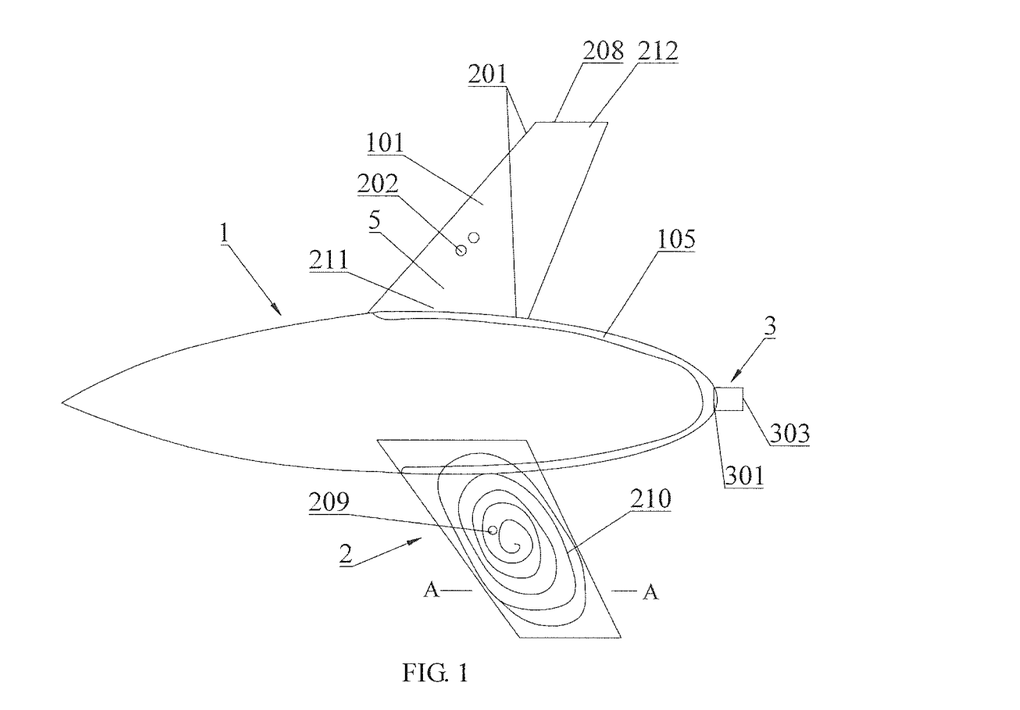
FIG. 1 is an overall structural view of an aircraft of the invention.
Figure 2:
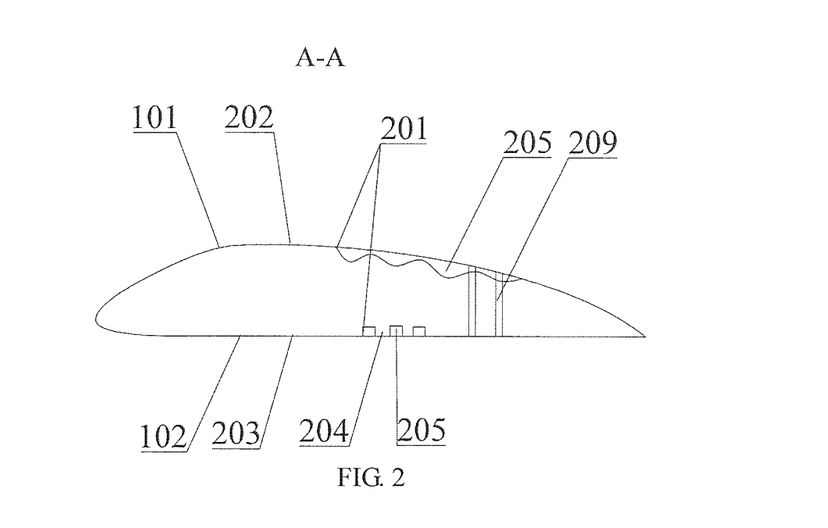
FIG. 2 is a sectional view along A-A of a wing shown in FIG. 1.

Referring to FIG. 1-FIG. 2, an aircraft comprises a fuselage and wings, wherein first channels are formed in the wings, a plurality of first inlets are formed in upper surfaces of the wings and are communicated with the first channels, the first channels extend in a lengthwise direction of the wings from roots of sides close to the fuselage to tails of sides away from the fuselage and are communicated with the outside via first outlets, and the first channels are internally provided with spoiler devices used to extend fluid paths and form high-speed fluid layers together with the upper surfaces of the wings. A plurality of first pressure ports are formed in lower surfaces of the wings and are communicated with the first inlets in the upper surfaces of the wings via the first channels, and the air intake area of the first inlets is larger than that of the first pressure ports, so that a pressure difference is generated via the first pressure ports due to the difference between a low external flow speed on the lower surfaces of the wings and a high flow speed of the high-speed fluid layers and counteracts an external fluid pressure on the upper surfaces of the wings in the opposite direction, so that a primary lift is generated by reduction of fluid resistance when fluid gradually flows through the upper surfaces and lower surfaces of the wings; and the fluid flows through the upper surfaces and lower surfaces of the wings along different paths to reach rear parts at the same time to generate a secondary lift.

From the above description, the invention has the following beneficial effects: on the basis of an objective factor that the flow speed on the lower surfaces of the wings is lower than the flow speed on the upper surfaces of the wings, the upper surfaces and lower surfaces of the wings are communicated with the fluid channels in the wings via the plurality of inlets, and the high-speed fluid layers are formed by the upper surfaces of the wings and the channels in the wings; when the fluid gradually flows through the upper surfaces and lower surfaces of the wings, an upward pressure difference is generated due to the difference between a high flow speed of the high-speed fluid layers and a low flow speed on the lower surfaces of the wings and counteracts the external fluid pressure on the upper surfaces of the wings in the opposite direction, so that the fluid resistance is reduced, and a lift is generated. In this invention, the primary lift is obtained by reduction of the resistance instead of by fluid continuity. In addition, the fluid flows through the upper surfaces and lower surfaces of the wings along different paths to reach the rear parts at the same time to generate a secondary lift.

Figure 3:
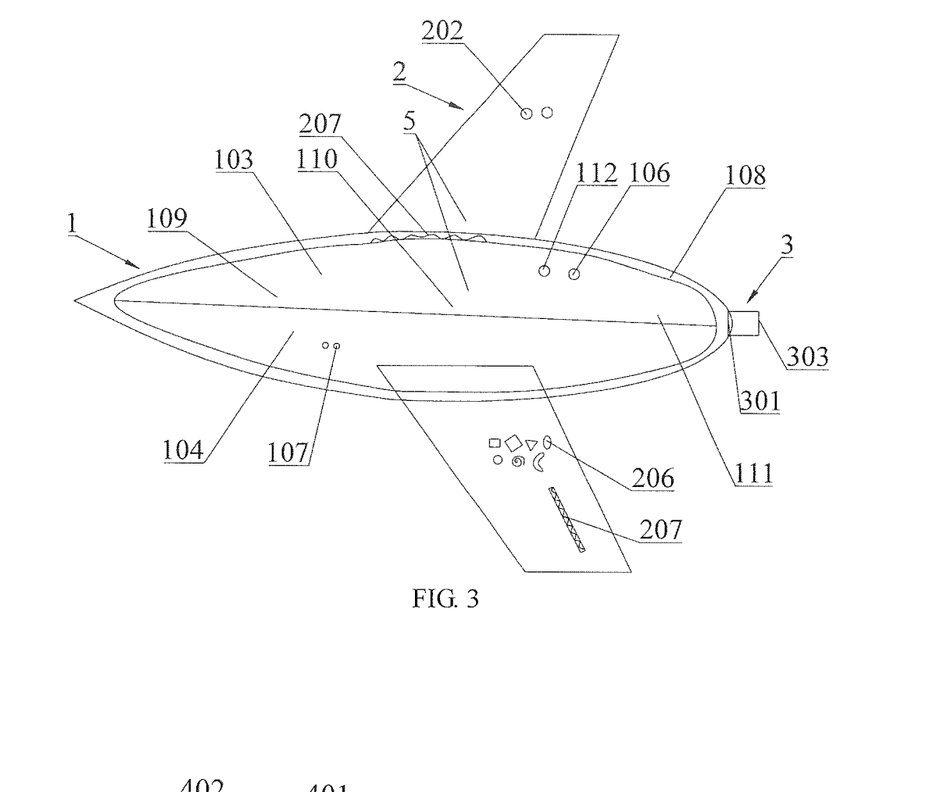
FIG. 3 is another overall structural view of the aircraft of the invention.

Referring to FIG. 1-FIG. 3, another technical solution adopted by the invention is as follows: an aircraft comprises a fuselage, wings, and an engine arranged on a rear part of the fuselage, wherein a plurality of first inlets are formed in upper surfaces of the wings, first channels are formed in the wings and are communicated with the first inlets, a plurality of first pressure ports are formed in lower surfaces of the wings and are communicated with the first channels, and the air intake area of the first inlets is larger than that of the first pressure ports; a suction port of the engine is communicated with the first inlets via a second channel and the first channels, and a pressure difference is generated due to the difference of a high flow speed of high-speed fluid layers formed by the upper surfaces of the wings and the first channels and a low flow speed on the lower surfaces of the wings and counteracts an external fluid pressure in the opposite direction, so that when fluid gradually flows through the upper surfaces and lower surfaces of the wings, a primary lift is generated by reduction of the fluid resistance; and the fluid flows through the upper surfaces and lower surfaces of the wings along different paths to reach rear parts at the same time to generate a secondary lift.

From the above description, the first inlets in the upper surfaces of the wings are communicated with the engine, so that the structures and functions of the wings, the fuselage and the engine are closely integrated. The first inlets are used as all available air inlets of the engines to meet the air intake requirements of the engine; by adoption of such structure, high-speed fluid layers are undoubtedly formed on the upper surfaces of the wings under a strong suction from the engine, and a large pressure difference and lift are generated between the high-speed fluid layers with a high flow speed and the lower surfaces, with a low flow speed of the wings in the natural state so that a lift is generated on the upper surfaces of the wings, a thrust is generated at the tail of the fuselage, and the function of lift generation and the function of thrust generation are organically combined through direct communication of the inlets in the upper surfaces of the wings and the engine at the tail of the fuselage. The optimized structure not only can generate a larger lift, but also can generate a larger thrust, and on this basis, a high-speed energy-saving aircraft is developed.

Figure 4:
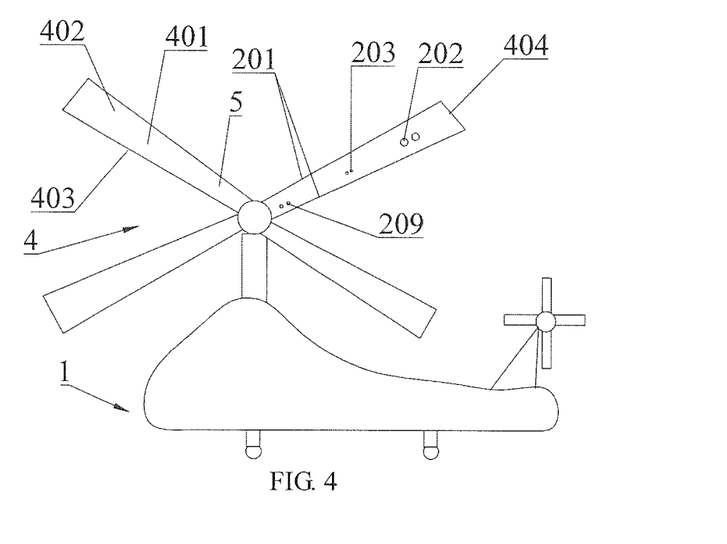
FIG. 4 is another overall structural view of the aircraft of the invention.

Referring to FIG. 2 and FIG. 4, another technical solution adopted by the invention is as follows: a propeller-driven helicopter or airplane comprises a fuselage and a propeller including a plurality of blades, wherein a plurality of first inlets are formed in upper surfaces of the blades, second outlets are formed in tails of the blades, and the first inlets are communicated with the outside via first channels formed in the blades in a lengthwise direction and the second outlets; a plurality of first pressure ports are formed in lower surfaces of the blades and are communicated with the first inlets via the first channels, and the air intake area of the first inlets is larger than that of the first pressure ports; fluid flows through the first channels and the upper surfaces of the blades in the lengthwise direction to form high-speed fluid layers and flows through the lower surfaces of the blades in a widthwise direction at a low flow speed to generate a secondary lift; and a pressure difference is formed between the high-speed fluid layers, which are formed by the first channels and the upper surfaces of the blades, and the lower surfaces of the blades, and counteracts an external fluid pressure on the upper surfaces of the blades in the opposite direction, so that when the fluid gradually flows through the upper surfaces and lower surfaces of the blades, a primary lift is generated by reduction of fluid resistance.

From the above description, when the propeller rotates at a high speed, fluid enters the first channels via the plurality of first inlets which have a large opening area and are uniformly distributed in windward sides of the blades, fluid paths are extended by a plurality of concave and convex channels and spoilers uniformly distributed in the first channels, the flow speed is increased accordingly, and two high-speed fluid layers which are communicated with each other and have approximately identical flow speeds are formed by the windward sides of the blades and the first channels, and huge siphonage is created via a plurality of (small holes) first pressure ports or pressure pipes by a low-speed high pressure generated by the external fluid on the leeward sides of the blades; and a pressure is transferred from the leeward sides with a high flow speed towards the high-speed fluid layers with a low flow speed to counteract an external fluid pressure in the opposite direction, so that the fluid resistance is reduced, and a lift is generated.

Referring to FIG. 1-FIG. 3, Embodiment 1: an aircraft comprises a fuselage 1 and wings 2, wherein a plurality of first pressure ports 203 (small holes) are formed in lower surfaces 102 of the wings and are communicated with first channels 201 in the wings 2, first inlets 202 are uniformly formed in upper surfaces 101 of the wings from roots 211 of the wings to tails 212 of the wings and are communicated with the first channels 201, first outlets 208 are formed in the tails of the wings 2 and are communicated with the first channels 201, and fluid flows through the wings in a lengthwise direction and is discharged via the first outlets 208 at the tails; spoiler devices are arranged in the first channels 201 of the wings to extend the paths of the fluid flowing through the first channels in the lengthwise direction of the wings and are located on a side towards the upper surfaces 101 or a side towards the lower surfaces 102, and the spoiler devices are arranged in part of the first channels or are arranged in the whole first channels. The spoiler devices are formed by a plurality of uniformly-distributed concave channels 204, convex channels 205, or small spoilers 206, wherein the concave channels 204 are concaved downwards relative to shell surfaces of the first channels 201, and the convex channels 205 protrude upwards relative to the shell surfaces of the first channels 201. Preferably, the concave channels 204 and the convex channels 205 are arc structures capable of extending the fluid paths to a greater extent.

The spoilers 206 are slightly concaved downwards or protrude upwards relative to the shell surfaces and are formed by one or more of small triangles, circles, rhombuses, trapezoids, ovals, spirals, arcs and other geometrical shapes, and a plurality of small-sized spoilers 206 are uniformly arrayed on shells to extend the fluid paths to a greater extent. For instance, a plurality of rhombuses are arrayed to form the convex channels 205 to extend the fluid paths, or a plurality of oval spoilers are concaved downwards relative to the shell surfaces to form the convex channels to extend the fluid paths. A plurality of concave spoilers are concaved downwards to form the concave channels or protrude upwards to form the convex channels.

Furthermore, the spoiler devices are spiral spoiler bars 207. A plurality of spoiler bars 207 having a certain length and a spiral outer surface are uniformly arranged in the first channels 201. Fluid can flow through the first channels around the spiral spoiler bars 207 circle by circle, and thus, the paths of the fluid flowing through the wings are extended to a larger extent.

Furthermore, external fluid on the upper and lower surfaces of the wings are communicated with the first channels 201 via the first inlets 202 and the first pressure ports 203 respectively, which means that the first channels 201 are actually fully-open channels directly communicated with the outside; just like an open space, the pressure in the fully-open channels is directly affected by the opening area of air inlets around, so that with the increase of the opening area of the first inlets 202 which are formed in the upper surfaces of the wings and communicated with the open channels, more fluid can enter the open channels, while less fluid will enter the open channels via the first pressure ports (small holes). Therefore, the air intake area of the first inlets 202 is larger than that of the first pressure ports 203 or is even much larger than that of the first pressure ports 203, and accordingly, the total air intake area of the first inlets 202 is much larger than that of the first pressure ports 203.

When the aircraft flies at a high speed, fluid flows through the upper surfaces and lower surfaces of the wings to generate fluid resistance, at this moment, the fluid enters the first channels 201 via the first inlets 202 uniformly distributed in the upper surfaces 101 of the wings and is then discharged via the first outlets 208 at the tails, and in this way, the fluid flows through the wings in the lengthwise direction defined by the first channels 201. In this process, the concave channels 204 and/or convex channels 205 and the spoilers 206 which are uniformly distributed in the first channels 201 extend the fluid paths and increase the flow speed in the first channels 201; then the flow speed of the fluid around each of the first inlets 202 in the upper surfaces of the wings is increased, the flow speed of the fluid around the multiple uniformly-distributed air inlets 202 is increased, the flow speed of the fluid flowing through the upper surfaces 101 of the wings is increased accordingly, and two high-speed fluid layers 5 which are communicated with each other and have approximately the same flow speed are formed on the upper surface 101 of the wings and in the first channels 201 to guide the fluid to flow through the wings in the lengthwise direction defined by the first channels 201 so as to create a high speed and a low pressure; a large pressure difference is generated between the low pressure and a high pressure generated by a low speed on the lower surfaces 102 of the wings, so that an external high pressure continuously enters the first channel 201 under the siphonage caused at the first pressure ports 203 (small holes) in the lower surfaces 102 of the wings and around, the external high pressure on the lower surfaces 102 of the wings may be directly transferred towards a low pressure of the high-speed fluid layers 5 is continuously via the first pressure ports 203 in a direction opposite to the external fluid pressure on the upper surfaces 101 of the wings so as to counteract the external fluid pressure, and thus a primary lift is obtained by reduction of fluid resistance.

Furthermore, as shown in FIG. 2, the upper surfaces and lower surfaces of the wings are communicated via a plurality of pressure pipes 209 which are uniformly distributed therebetween, and under the siphonage caused by the high-speed fluid layers 5, and the high external pressure on the lower surfaces of the wings is continuously transferred towards the low pressure generated on the upper surfaces of the wings via each of the uniformly-distributed pressure pipes 209 (small holes) in a direction opposite to the external fluid pressure on the upper surfaces of the wings so as to counteract the external fluid pressure, so that a primary lift is obtained by reduction of fluid resistance.

Furthermore, the lower surfaces 102 of the wings are provided with a plurality of pressure ports 203 and/or pressure pipes 209 to be communicated with the upper surfaces of the wings, so that more of the high pressure generated on the lower surfaces of the wings is continuously transferred towards the low pressure generated on the upper surfaces of the wings.

In the invention, every moment when fluid gradually flows through the upper surfaces and lower surfaces of the wings before reaching the tails of the wings to realize fluid continuity, the fluid pressure on the lower surfaces of the wings can be released, the first pressure ports 203 and/or pressure pipe 209 are communicated with the upper surfaces of the wings (while the fluid pressure of traditional wings cannot be released and has to be borne by the wings, and consequentially, fluid resistance is generated), and the fluid pressure on the lower surfaces of the wings counteracts the external fluid pressure on the upper surfaces of the wings in the opposite direction to enable the wings to move, and thus, a primary lift is generated.

Fluid resistance is generated when fluid flows through the upper and lower surfaces of the traditional wings along different paths, more power has to be consumed to overcome the fluid resistance, and thus, a lift can be indirectly generated after the fluid reaches rear parts of the wings at the same time to be converged.

On the contrary, the primary lift is generated independent of the fluid continuity in the invention, and when fluid gradually flows through the lower surfaces of the wings, the high pressure on the lower surfaces of the wings is uniformly transferred to the low pressure generated by the high-speed fluid layers via the first pressure ports and/or pressure pipes in a direction opposite to the external pressure so as to counteract the external pressure; and with the increase of the flow speed difference between the lower surfaces of the wings and the high-speed fluid layers, more fluid resistance will be reduced, and a larger lift will be generated.

In the invention, when the fluid flows through the upper and lower surfaces of the traditional wings along different paths to reach the tails of the wings at the same time, a larger pressure difference is generated between the high-speed fluid layers and the lower surfaces of the wings, and thus, a larger secondary lift is obtained.

Therefore, the primary lift and the secondary lift of the invention are larger than the lift generated by the traditional wings.

Furthermore, a high-speed aircraft generating a large lift and thrust is developed by superposition of the primary lift and the secondary lift.

Embodiment 2: this embodiment differs from Embodiment 1 in that a plurality of rows of first inlets 202 are uniformly formed in the upper surfaces 101 of the wings from roots 211 to tails 212 in the lengthwise direction and are communicated with the first channel 201, so that two high-speed fluid layers 5 which are communicated with each other and have approximately identical flow speeds are formed by the upper surfaces of the wings and the first channel 201 to guide the fluid to flow through the upper surfaces of the wings in the lengthwise direction. A plurality of rows of pressure pipes 209 (small holes) are uniformly on the lower surfaces 102 of the wings in the widthwise direction and are communicated with the upper surfaces of the wings (fluid naturally flows through the upper surfaces and lower surfaces of the wings in the widthwise direction); under the fluid continuity, the fluid flows through the upper surfaces 101 of the wings in the lengthwise direction and flows through the lower surfaces 102 of the wings in the widthwise direction to reach the tails of the wings at the same time, and in this process, a pressure difference and a larger secondary lift are generated due to different flow speeds. Generally, the dimension of the wings in the lengthwise direction is multiple times greater than that in the widthwise direction, so that when the fluid flows through the upper surfaces and lower surfaces of the wings along different paths to reach the tails of the wings at the same time, a much larger pressure difference is generated due to different flow speeds of the fluid flowing through the upper surfaces of the wings in the lengthwise direction and flowing through the lower surfaces of the wings in the widthwise direction, and accordingly, a secondary lift is generated. Even if the spoiler devices are removed, the secondary lift which is multiple times larger than that of the traditional wings can still be generated.

Furthermore, the spoiler devices are able to extend the paths of fluid flowing through the wings in the lengthwise direction by multiple times, so that a larger pressure difference and a larger secondary lift are generated due to different flow speeds of the fluid flowing through the upper surfaces of the wings in the lengthwise direction and flowing through the lower surfaces of the wings in the widthwise direction.

Embodiment 3: as shown in FIG. 3, this embodiment differs from Embodiment 1 in the following aspects: the fuselage 1 comprises an upper half 103 and a lower half 104, a third channel 108 is formed in a shell around the fuselage 1, a plurality of second inlets 106 are uniformly formed in the upper half of the fuselage and are communicated with the third channel 108, and a plurality of second pressure ports 107 are uniformly formed in the lower half of the fuselage and are communicated with the third channel 108. The opening area of the second inlets 107 is larger than that of the second pressure ports 107, and spoiler devices are arranged in the third channel 108 corresponding to the upper half 103 of the fuselage to extend the fluid path and to increase the flow speed, so that high-speed fluid layers 5 are formed in the shell of the upper half 103 of the fuselage and the corresponding third channel 108, a pressure difference is generated due to different flow speeds of the high-speed fluid layers 5 and external fluid on the lower half 104 of the fuselage 1; and great siphonage is generated at the second pressure ports 107 in the lower half under the pressure difference to guide the external high pressure to continuously enter the third channel 108 via the second pressure ports to transfer the pressure difference towards a low pressure of the high-speed fluid layers 5 in a direction opposite to the external fluid pressure on the upper half 103 so as to counteract the external fluid pressure, so that the fluid resistance is reduced, and a larger primary lift is obtained (the fuselage cannot generate a lift in the common knowledge).

Furthermore, on the basis of fluid continuity, a larger secondary lift is generated due to different flow speeds of the upper half and the lower half of the fuselage.

Embodiment 4: as shown in FIG. 1 and FIG. 2, an aircraft in this embodiment differs from the aircraft in Embodiment 3 in that all air inlet ducts of the aircraft are formed in the first inlets 202 in the upper surfaces of the wings. The suction port 301 of the engine 3 is communicated with the first inlets 202 via the first channels 201 in the wings and the second channel 105 in the rear part of the fuselage, a jet port 302 of the engine 3 is communicated with the outside, and the aircraft in this embodiment is the same as the aircraft in Embodiment 3 in other aspects. The first inlets 202 uniformly distributed in the large areas of the upper surfaces 101 of the wings are used as unique air inlets of the engine 3 to provide all air required by the engine, and the opening area of the first inlets 202 is larger or even much larger than the opening area of the first pressure ports 203 and the opening area of the pressure pipes 209. Through the special optimized structure, when the aircraft flies at a high speed, a large quantity of fluid is sucked into the first channels 201 via the uniformly-distributed inlets 202 by a strong suction generated by the engine 3, so that two high-speed fluid layers 5 which are communicated with each other and have approximately identical flow speeds are formed by the upper surfaces of the wings and the first channels 201. Under the great siphonage generated by the low pressure of the high-speed fluid layers 5, the high pressure on the lower surfaces of the wings is continuously transferred towards the low pressure generated by the high-speed fluid layers 5 via the first inlets 202 and/or the pressure pipes 209.

Obviously, by control over the engine, the speed of fluid flowing through the high-speed fluid layers 5 in the lengthwise direction of the wings is made several times, tens of times, or even more times higher than the speed of fluid flowing through the lower surfaces 102 of the wings in the widthwise direction in the natural state, and ten or more times the pressure difference is generated to transfer more than 10% of the fluid pressure of the wings to the outside (the thrust is improved by 100% theoretically); and the pressure difference is opposite to an external fluid pressure on the upper surfaces 101 of the wings so as to counteract the external fluid pressure, so that a larger primary lift is obtained by reduction of fluid resistance. In this case, the first outlets 208 of the wings are sealed or are not sealed.

Furthermore, traditional air inlet ducts are omitted, so that the area of the windward side of the aircraft is drastically reduced, and accordingly, the fluid resistance is greatly reduced. The first air inlets 202 are uniformly formed in the upper surfaces 101 of the wings and are directly communicated with the engine 3 on the rear part of the fuselage 1 via the first channels and the second channel, so that the overall pneumatic structure of the aircraft organically integrates the function of lift generation and the function of thrust generation, and such optimized structure not only can generate a larger lift, but also can reduce more fluid resistance. On this basis, a high-speed energy-saving aircraft of a novel structure is developed.

Furthermore, spoiler devices are arranged in the first channels 201 of the wings and are spiral spoiler surfaces 210 which are concave or convex relative to the surfaces of the first channels 201, and the spiral spoiler surfaces 210 are arranged in part of the first channels 201 or in the whole first channels 201 to extend fluid paths; and fluid sucked into the first channels by the engine flows circle by circle around the center of the first channels along the spiral spoiler surfaces 210, so that the fluid paths are extended (this is a common practice in the art), a larger pressure difference is generated between the high-speed fluid layers 6 with a high flow speed formed by the first channels 201 and the upper surfaces 101 of the wings with a low flow rate in the natural state, and accordingly, a secondary lift force is generated.

Embodiment 5: this embodiment differs from Embodiment 4 in that a pipe (not shown, common practice in the art) is arranged at the tail 212 of each wing, wherein an opening in one end of the pipe is communicated with the first channel 201 in the wing, the other end of the pipe is communicated with the suction port of the engine via the second channel 105, and in this case, the first outlets 208 of the wings are sealed.

Under the great suction of the engine, fluid on the upper surfaces 10 of the wings is sucked in at the wingtips via the first inlets 202, and then flows through the upper surfaces of the wings from inside to outside at a high speed in the lengthwise direction and flows through the lower surfaces of the wings in the widthwise direction to generate a larger pressure difference and a secondary lift.

Embodiment 6: referring to the aircraft shown in FIG. 4, a propeller-driven helicopter (to facilitate description, the upper surface refers to the windward side, and the lower surface refers to the leeward side) comprises a fuselage 1 and a propeller 4 arranged on an upper part of the fuselage, wherein the propeller 4 comprises a plurality of blades 401, and first channels 201 are formed in shells of the blades 401 in a lengthwise direction from roots to tails of wings and are communicated with second outlets 404 at the tails, and a plurality of first inlets 202 are formed in windward sides 403 in the lengthwise direction and are communicated with the first channels 201; a plurality of first pressure ports 203 are formed in leeward sides 403 of the blades 401 and are communicated with the first channels 201, or the windward sides and the leeward sides of the blades are communicated via pressure pipes 209; and the air intake area of the first inlets 202 is larger than that of the first pressure ports 203 or/and the pressure pipes 209.

Fluid flows through the first channels 201 and the windward sides 402 of the blades in the lengthwise direction to form high-speed fluid layers 5 and flows through the leeward sides 403 in the widthwise direction at a low flow speed to generate a pressure difference which is the source of a secondary lift. The length of the blades of the propeller is generally about 20 times greater than the width of the blades, so that a pressure difference of about 20 times and a secondary lift of about 20 times are generated.

Furthermore, a pressure difference of about 20 times is generated between high-speed fluid layers 5 formed by the first channels 201 and the windward sides of the blades and the leeward sides 403 having a low flow speed via the first pressure ports 203 and/or the pressure pipes 209 and counteracts an external fluid pressure on the windward sides 402 of the blades in the opposite direction, so that a primary lift is generated by reduction of fluid resistance when fluid gradually flows through the upper and lower surfaces of the blades. The pressure difference of about 20 times can counteract more fluid resistance, and thus, a larger primary lift is obtained.

Furthermore, because the blades 401 of the propeller are very long, the first channels 201 are formed in rear areas away from the blades 401 in the lengthwise direction to be communicated with the first inlets 202 in the windward sides to form the high-speed fluid layers, and a larger pressure difference and lift are generated due to different flow speeds of the high-speed fluid layers 5 and front halves of the blades 401.

Embodiment 7: this embodiment provides a propeller-driven airplane and differs from the above embodiment in the following aspects: the propeller 4 is arranged on a front part 109 (not shown, common practice in the art) of the fuselage 1, and a plurality of first inlets 202 and/or pressure pipes 209 are arranged on the windward sides 402 of the blades 401 in the lengthwise direction, so that a pressure difference is transferred from the leeward sides 403, having a low-speed high external fluid pressure thereon, of the blades 401 towards the high-speed fluid layer 5 formed by the windward sides 402 in a direction opposite to the external pressure so as to counteract the external pressure, and a thrust is generated by reduction of the fluid resistance.

The above embodiments are only illustrative ones of the invention, and are not intended to limit the patent scope of the invention. All equivalent transformations obtained on the basis of the contents in the specification and accompanying drawings, or direct or indirect applications to relevant technical fields should also fall within the patent protection scope of the invention.

What is claimed is:
1. An aircraft, comprising a fuselage, wings, and an engine arranged on a rear part of the fuselage, wherein:
 a plurality of pressure pipes are uniformly distributed between upper surfaces and lower surfaces of the wines to communicate the upper surfaces and the lower surfaces of the wings; a plurality of first inlets are formed in the upper surfaces of the wings to provide all air for the engine; an air intake area of the first inlets is larger than that of the pressure pipes;

the engine communicates with the first inlets through the first channels inside the wings to cause a high-speed fluid layer be generated on the upper surfaces of the wings; the high-speed fluid layer generates a low pressure and a low-speed fluid generated on the lower surfaces of the wings generates a high pressure the high-speed fluid layer and the low-speed fluid are communicated through the pressure pipes;

the high pressure on the lower surfaces of the wings passes through a short path in the pressure tubes to generate a small friction force to flow to the low pressure on the upper surfaces of the wings;

the high pressure on the lower surfaces of the wings generates upward pressure, whose direction is opposite to a downward pressure generated b an external fluid on the upper surfaces of the wings, to reduce a fluid pressure on the upper surfaces of the wings.

2. The aircraft according to claim 1, wherein spiral spoiler surfaces which are concave or convex relative to an inner wall of the first channels are arranged in a part of the first channels or in the whole first channels.

3. The aircraft according to claim 1, wherein a suction port of the engine is communicated with the first inlets via second channels in a rear part of the fuselage and the first channels in the wings; and the first inlets are ail available air inlets of the engine, so that a function of lift generation and a function of thrust generation are combined on the overall pneumatic layout of the aircraft.

4. The aircraft according to claim 2, wherein under a suction of the engine, the fluid rotates around the spiral spoiler surfaces in the first channels circle by circle, so that a fluid on the upper surfaces of the wings is made to go through a longer path to form an high-speed fluid, and a pressure difference is generated to generate a lift between the high-speed fluid and the low-speed fluid on the lower surfaces of the wings.

5. The aircraft according to claim 1, wherein the first inlets uniformly distributed on the upper surfaces of the wings are only air inlets of the engine; the first inlets are all air inlet ducts of the engine.

6. The aircraft according to claim 1, wherein the high pressure on the lower surfaces of the wings and the low pressure on the upper surfaces of the wings produce a siphon phenomenon through the plurality of pressure pipes, so that the high pressure on the lower surfaces of the wings passes in the pressure pipes and continuously flows to the low pressure on the upper surfaces of the wings to reduce friction.

7. The aircraft according to claim 1, wherein
a pressure difference is generated to generate a lift between the high-speed fluid layer generated on the upper surfaces of the wings under an action of a suction of the engine and the low-speed fluid on the lower surfaces of the wings.

8. The aircraft according to claim 1, wherein in a process of fluid when gradually passing through the upper surfaces and the lower surfaces of the wings, the high pressure on the lower surfaces of the wings gradually flows to the low pressure generated by the high-speed fluid layer on the upper surfaces of the wings through the pressure tubes, a pressure direction of the pressure tubes is opposite to a pressure direction of the external fluid on the upper surfaces of the wings to counteract each other, a low pressure area is formed on the upper surfaces of the wings to generate a lift by reducing the fluid pressure on the upper surfaces of the wings.

* * * * *